Feb. 20, 1968  R. W. BUSHMEYER  3,369,496
FLOW CONTROL VALVE FOR CONCRETE PUMP
Filed March 4, 1966
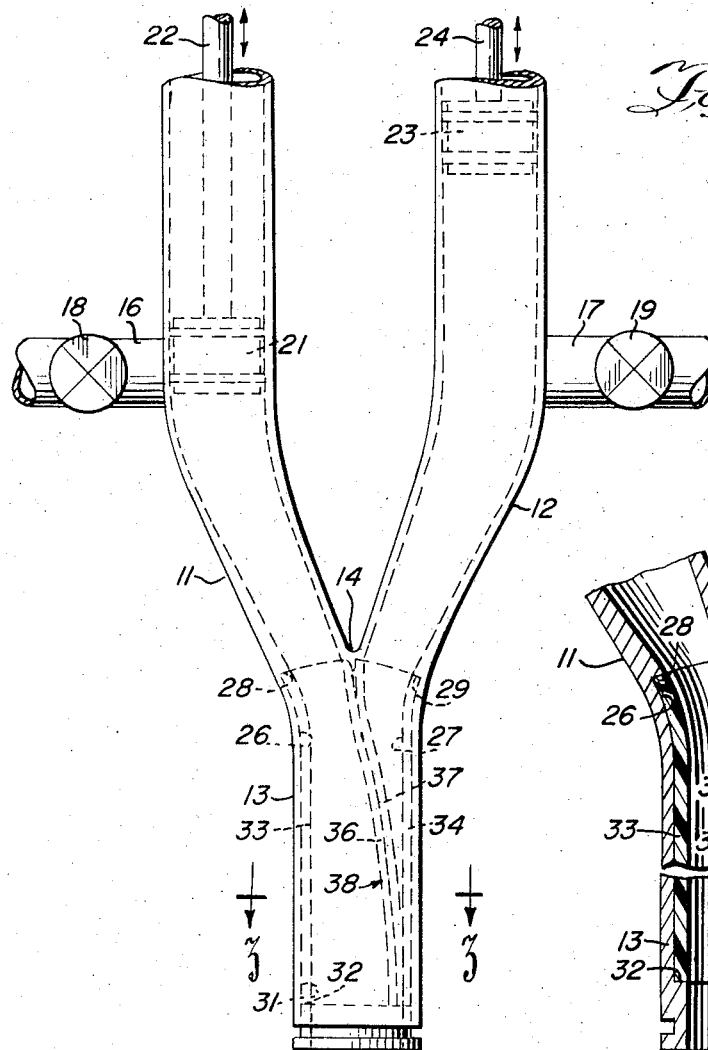
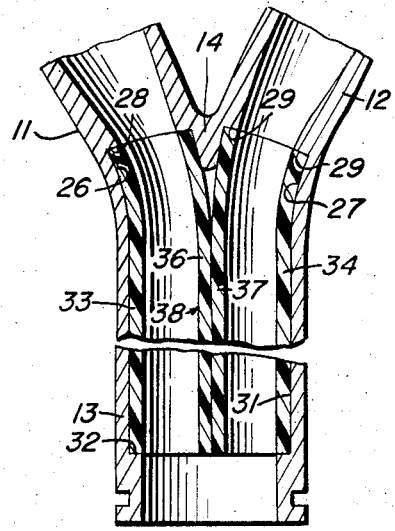
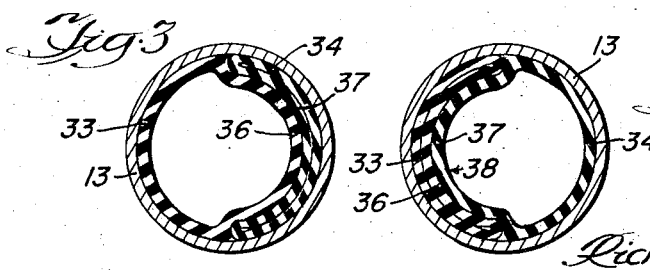
INVENTOR
Richard W. Bushmeyer
BY
Dressler, Goldsmith, Clement & Gordon
ATTORNEYS United States Patent Office
3,369,496
Patented Feb. 20, 1968

3,369,496
FLOW CONTROL VALVE FOR CONCRETE PUMP
Richard W. Bushmeyer, Rockford, Ill., assignor to J. I.
Case Company, a corporation of Wisconsin
Filed Mar. 4, 1966, Ser. No. 531,838
2 Claims. (Cl. 103—170)

ABSTRACT OF THE DISCLOSURE

Two conduits for the flow of concrete are merged into a single conduit and a flexible diaphragm at the juncture of the conduits serves as a valve to effectively close the second conduit while concrete flows through the first conduit, and the first conduit is closed while concrete flows through the second conduit. The flexible diaphragm provides a simple, efficient, inexpensive valve means for insuring continuity of flow through the final conduit when concrete is pumped through the two conduits intermittently.

---

This invention relates to a flow control valve, and is particularly concerned with a simple diaphragm type valve capable of increasing the efficiency of apparatus for flowing concrete and similar thick sluggish masses by combining intermittent flows from each of a pair of tubular conduits into a substantially continuous flow in a single conduit of approximately the same cross-sectional size as one of said pair of conduits.

The combination of separate flow passageways for concrete or similar material into single passageways is well known, but, heretofore, such combinations have been characterized by the use of complicated valving systems that require expensive maintenance.

In accordance with the present invention, a pair of conduits, each of which has flowable material, such as concrete, forced therethrough by a piston, are merged into a single conduit having a cross section approximately equal to the cross section of each conduit of the pair of conduits. A flexible diaphragm assembly extends from the juncture of the pair of conduits into the single conduit and comprises the valving means for closing one of the merged conduits during the flow period of the other to maintain maximum flow efficiency with minimum maintenance.

Suitable structure by means of which the above mentioned and other advantages of the invention are attained is fully described in the following specification, taken in conjunction with the accompanying drawings showing a preferred illustrative embodiment of the invention, in which:

FIGURE 1 is a diagrammatic elevational view showing a pair of conduits merged into a single conduit with the valve shown in phantom in the position occupied when one of the pistons is flowing material into one of the pair of conduits;

FIGURE 2 is an enlarged fragmentary cross-sectional view showing the valve secured adjacent the juncture of the pair of conduits when there is no flow in the system;

FIGURE 3 is an enlarged cross-sectional view taken along the line 3—3 of FIGURE 1; and FIGURE 4 is a view, similar to FIGURE 3, showing the valve in the position occupied when the flow is in the other conduit of a pair of conduits.

In the drawings, a pair of separate conduits 11 and 12 are merged into a single conduit 13 adjacent a juncture 14. The conduits 11, 12, and 13 are shown as a structurally integral unit, but it will be understood that each conduit may comprise a plurality of sections of any convenient length secured together in conventional manner. All three conduits have approximately equal cross-sectional areas throughout most of their length, but the cross-sectional areas of the conduits 11 and 12 are gradually reduced in the area adjacent the juncture 14, with maximum restriction at the juncture.

The conduit 11 has an inlet 16 connected thereto above the juncture 14 and the conduit 12 has a similar inlet 17 connected to it. The inlets 16 and 17 are each connected to a mixer or other source of concrete and are provided with valves 18 and 19, respectively. Concrete flows into the conduit 11 when the valve 18 is open, and into the conduit 12 when the valve 19 is open. A piston 21 and its rod 22 are mounted in the conduit 11, and a second piston 23 and its rod 24 are mounted in the conduit 12. Reciprocation of the pistons 21 and 23 is timed so that the pumping stroke of one piston coincides with the suction stroke of the other. During the suction stroke of the piston 21, the valve 18 is open and the valve 19 is closed. During the pumping stroke of the piston 21 the valve 18 is closed and the valve 19 is open. The suction stroke of each piston allows the concrete to flow into its conduit between the piston and the merging portion of the pair of conduits.

The inner wall surfaces of the conduits 11 and 12 are recessed, as indicated at 26 and 27, respectively, to provide annular shoulders 28 and 29 adjacent the juncture 14. The inner wall surface of the conduit 13 is recessed, as indicated at 31, to provide an annular shoulder 32 of the depth as that of the shoulders 28 and 29. Two flexible tubular liners 33 and 34 are disposed in the conduit 13 in side-by-side relationship with one end of the liner 33 abutting the annular shoulder 28 and one end of the liner 34 abutting the annular shoulder 29. The opposite end of each liner abuts the annular shoulder 32 around a portion of its circumference. Both liners 33 and 34 have a thickness equal to the depth of the recesses 26, 27 and 31, thereby making the inner wall surfaces of the liners flush with the adjacent inner wall surfaces of the conduits. The abutting relationship between the liners and the shoulders prevents accidental longitudinal displacement of the liners in either longitudinal direction.

The liners 33 and 34 have centrally disposed adjoining wall sections 36 and 37 depending from the juncture 14 into the conduit 13 to form a flexible diaphragm 38. The concrete forced through the conduit 11 by the pumping stroke of the piston 21 expands the tubular liner 33 until the diaphragm 38 engages the inner wall surface of the liner 34 at the opposite side of the conduit 13. Thus, the diaphragm permits the unimpeded flow of concrete through the conduit 11 and completely blocks the flow of concrete through the conduit 12. When the piston 21 starts its suction stroke and the piston 23 starts its pumping stroke, the pressure in the conduit 12 becomes greater than the pressure in the conduit 11 and reverses the movement of the diaphragm to open the flow passageway between the conduit 12 and the conduit 13 while blocking the flow of concrete through the conduit 11. The total flow of concrete, alternated between the conduits 11 and 12, utilizes the full flow capacity of the conduit 13.

Although a preferred embodiment of the invention has been described in considerable detail, it will be understood that the description thereof is intended to be illustrative, rather than restrictive, as many details of structure may be modified or changed without departing from the spirit or scope of the invention. Accordingly, it is not desired to be restricted to the exact structure disclosed.

I claim:
1. A flow system comprising a pair of conduits in flow communication with a pump having pistons operable to direct material through each conduit intermittently, each of said pistons having its pumping stroke synchronized with the suction stroke of said other piston whereby mate- rial flows into each conduit alternately, said conduits merging adjacent one end into a tubular housing having a cross-sectional area less than the total cross-sectional areas of said conduits adjacent the juncture of said conduits, a pair of tubular liners each having one end secured in one of said conduits, said liners extending from the juncture of said conduits into said tubular housing in side-by-side relationship, the adjoining wall sections of said tubular liners forming a flexible diaphragm movable against one inner wall surface of said housing in response to pressure of material flowing through one of said conduits to permit unimpeded flow of material through said one conduit and movable against the opposite inner wall surface of said housing in response to pressure of material flowing through said other conduit to permit unimpeded flow of material through said second mentioned conduit, whereby a substantially continuous flow of material through said housing is maintained.

2. A flow system comprising a pair of conduits merging together, a common outlet spaced from the juncture of said pair of conduits, and valve means in flow communication with the merged end portion of said pair of conduits and said outlet, said valve means including a valve housing and a flexible diaphragm comprising adjoining wall sections of two flexible liners disposed in the housing in side-by-side relationship, and extending from the juncture of said pair of conduits, said diaphragm being movable in response to the pressure of material flowing through one of said conduits to open the flow passageway between said one conduit and said outlet, and to close the flow passageway between said other conduits and said outlet, and said diaphragm being movable in response to the pressure of material flowing through said second mentioned conduit to close said first mentioned flow passageway and to open said second mentioned flow passageway when the pressure in said second mentioned conduit exceeds the pressure in said first mentioned conduit.

References Cited
UNITED STATES PATENTS

| | | | |
|---|---|---|---|
| 443,071 | 12/1890 | Chapman | 137—512.4 |
| 529,432 | 11/1894 | Van Pelt | 103—170 |
| 2,225,840 | 12/1940 | Newton | 137—112 |
| 3,085,549 | 4/1963 | Kacsuta | 137—525 |
| 3,139,932 | 7/1964 | Johnson | 137—112 |

HENRY F. RADUAZO, *Primary Examiner.*